United States Patent
Kim et al.

(10) Patent No.: US 10,275,349 B2
(45) Date of Patent: Apr. 30, 2019

(54) DATA STORAGE DEVICE AND THE OPERATING METHOD THEREOF

(71) Applicant: SK hynix Inc., Gyeonggi-do (KR)

(72) Inventors: Jin Woong Kim, Gyeonggi-do (KR); Ik Sung Oh, Gyeonggi-do (KR); Seung Wan Jung, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 268 days.

(21) Appl. No.: 15/202,885

(22) Filed: Jul. 6, 2016

(65) Prior Publication Data

US 2017/0255550 A1 Sep. 7, 2017

(30) Foreign Application Priority Data

Mar. 7, 2016 (KR) .................. 10-2016-0027151

(51) Int. Cl.
 *G06F 12/02* (2006.01)
 *G06F 3/06* (2006.01)

(52) U.S. Cl.
 CPC ........ *G06F 12/0253* (2013.01); *G06F 3/0608* (2013.01); *G06F 3/0652* (2013.01); *G06F 3/0679* (2013.01); *G06F 3/0688* (2013.01); *G06F 2212/702* (2013.01)

(58) Field of Classification Search
 CPC .......................... G06F 3/0679; G06F 12/0253
 See application file for complete search history.

(56) References Cited

U.S. PATENT DOCUMENTS

| | | | | |
|---|---|---|---|---|
| 2013/0326120 A1* | 12/2013 | Cheng | ................ | G06F 12/0246 711/103 |
| 2015/0193340 A1 | 7/2015 | Liang | | |
| 2015/0347295 A1* | 12/2015 | Ihm | ..................... | G06F 12/0253 711/103 |
| 2016/0283368 A1* | 9/2016 | Hada | ................... | G06F 12/0253 |

* cited by examiner

*Primary Examiner* — Van H Oberly
(74) *Attorney, Agent, or Firm* — IP & T Group LLP

(57) ABSTRACT

A method for operating a data storage device includes determining a valid page distribution characteristic of used memory blocks; and performing a garbage collection operation based on the valid page distribution characteristic of used memory blocks.

16 Claims, 11 Drawing Sheets

DATA STORAGE DEVICE AND THE OPERATING METHOD THEREOF

CROSS-REFERENCES TO RELATED APPLICATION

The present application claims priority under 35 U.S.C. § 119(a) to Korean application number 10-2016-0027151, filed on Mar. 7, 2016, in the Korean Intellectual Property Office, which is Incorporated herein by reference in its entirety.

BACKGROUND

1. Technical Field

Various embodiments generally relate to a data storage device including a nonvolatile memory device as a storage medium.

2. Related Art

Recently, the paradigm for the computer environment has been converted into ubiquitous computing so that computer systems can be used anytime and anywhere. Due to this, use of portable electronic devices, for example, mobile phones, digital cameras, and notebook computers has rapidly increased. In general, such portable electronic devices use a data storage device which uses a memory device. A data storage device is used to store data to be used in a portable electronic device.

A data storage device using a memory device provides advantages in that, since there is no mechanical driving part, stability and durability are excellent, an information access speed is high and power consumption is small. Data storage devices having such advantages include a universal serial bus (USB) memory device, memory cards having various interfaces, a universal flash storage (UFS) device, and a solid state drive (SSD).

SUMMARY

Various embodiments are directed to an operating method of a data storage device, capable of optimizing a garbage collection operation according to a valid page distribution characteristic.

In an embodiment, a method for operating a data storage device may include: determining a trigger value that is proportional to a minimum number of empty memory blocks which should be secured and is inversely proportional to a valid page distribution characteristic of used memory blocks meaning a state in which valid pages of used memory blocks are distributed; performing a garbage collection operation by a first garbage collection throughput in the case where a number of currently empty memory blocks is larger than the trigger value; and performing a garbage collection operation by a second garbage collection throughput in the case where a number of currently empty memory blocks is equal to or smaller than the trigger value.

In an embodiment, a method for operating a data storage device may include: determining a valid page distribution characteristic of used memory blocks; and performing a garbage collection operation based on the valid page distribution characteristic of used memory blocks.

In an embodiment, a data storage device may include: a memory device including a plurality of memory blocks; and a controller suitable for determining a valid page distribution characteristic of used memory blocks among the plurality of memory blocks, and performing a garbage collection operation based on the valid page distribution characteristic of used memory blocks.

According to the embodiments, the garbage collection operation of a data storage device may be optimized, and hence, the operating speed of the data storage device may be enhanced.

DETAILED DESCRIPTION

Figure 1:
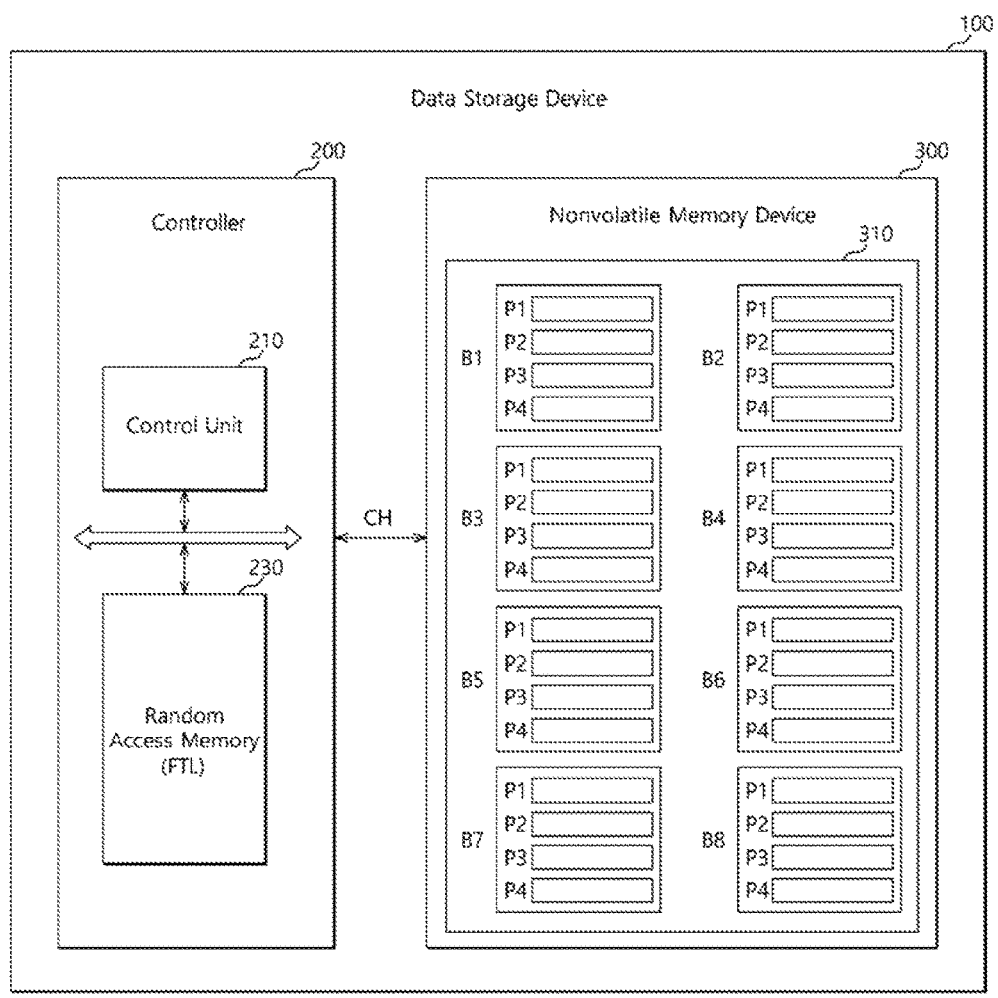
FIG. 1 is a block diagram illustrating a data storage device, according to an embodiment of the present invention.

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in sufficient detail to enable a person skilled in the art to which the invention pertains to practice the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes," "including," "comprises" and/or "comprising" when used in this specification, specify the presence of at least one stated feature, step, operation, and/or element, but do not preclude the presence or addition of one or more other features, steps, operations, and/or elements thereof.

Hereinafter, an operating method of a data storage device will be described below with reference to the accompanying drawings through various examples of embodiments.

Referring now to FIG. 1 a data storage device 100 is provided, according to an embodiment of the present invention.

According to the embodiment of FIG. 1, the data storage device 100 may include a controller 200 and a nonvolatile memory device 300. The controller 200 may include a control unit 210 and a random access memory 230.

The data storage device 100 may store data to be accessed by a host device (not shown), for example, a mobile phone, an MP3 player, a laptop computer, a desktop computer, a game player, a TV, an in-vehicle infotainment system, and the like. The data storage device 100 may also be referred to as a memory system.

The data storage device 100 may be manufactured as any one of various storage devices according to the protocol of an interface which is coupled electrically with the host device. For example, the data storage device 100 may be configured as any one of various storage devices, for example, a solid state drive, a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and the like.

The data storage device 100 may be manufactured as any one among various packages, for example, a package-on-package (POP), a system-in-package (SIP), a system-on-chip (SOC), a multi-chip package (MCP), a chip-on-board (COB), a wafer-level fabricated package (WFP), and a wafer-level stack package (WSP).

The control unit 210 may drive an instruction or an algorithm of a code type (e.g., a software), and may analyze and process a request inputted from the host device. The control unit 210 may control the nonvolatile memory device 300 through a memory control unit (not shown) to process a request from the host device.

The random access memory 230 may store a software to be driven by the control unit 210. Also, the random access memory 230 may store data necessary for the driving of the software, for example, metadata. That is to say, the random access memory 230 may operate as the working memory of the control unit 210. The random access memory 230 may temporarily store data to be transmitted from the host device to the nonvolatile memory device 300 or from the nonvolatile memory device 300 to the host device. In other words, the random access memory 230 may operate as a data buffer memory or a data cache memory.

The nonvolatile memory device 300 may operate as the storage medium of the data storage device 100. The nonvolatile memory device 300 may be configured by any one of various nonvolatile memory devices, for example, a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RERAM) using a transition metal oxide. The ferroelectric random access memory (FRAM), the magnetic random access memory (MRAM), the phase change random access memory (PCRAM) and the resistive random access memory (RERAM) are a kind of nonvolatile random access memory devices capable of random access to memory cells. The nonvolatile memory device 300 may be configured by a combination of a NAND flash memory device and the above-described various nonvolatile random access memory devices. In the following descriptions, the nonvolatile memory device 300 which is configured by a NAND flash memory device (hereinafter, referred to as a flash memory device) will be exemplified.

The flash memory device 300 may include a memory cell region 310. The memory cell region 310 may include a plurality of memory blocks. Each of the plurality of memory blocks may include a plurality of pages. From an operational viewpoint or a physical (or structural) viewpoint, the memory cells included in the memory cell region 310 may be configured into a hierarchical memory cell set or memory cell unit. For example, memory cells which are coupled to the same word line and are to be read and written (or programmed) simultaneously may be configured as a page P. In the following descriptions, for the sake of convenience in explanation, memory cells configured as a page P will be referred to as a "page." Also, memory cells to be erased simultaneously may be configured as a memory block B.

In the following descriptions, for example, the memory region 310 is configured by 8 memory blocks B1 to B8. Further, also as an example, each of the memory blocks B1 to B88 is shown to include 4 pages P1 to P4. The number of memory blocks and of the pages which may be changed by design without departing from the scope of the present invention.

Figure 2:
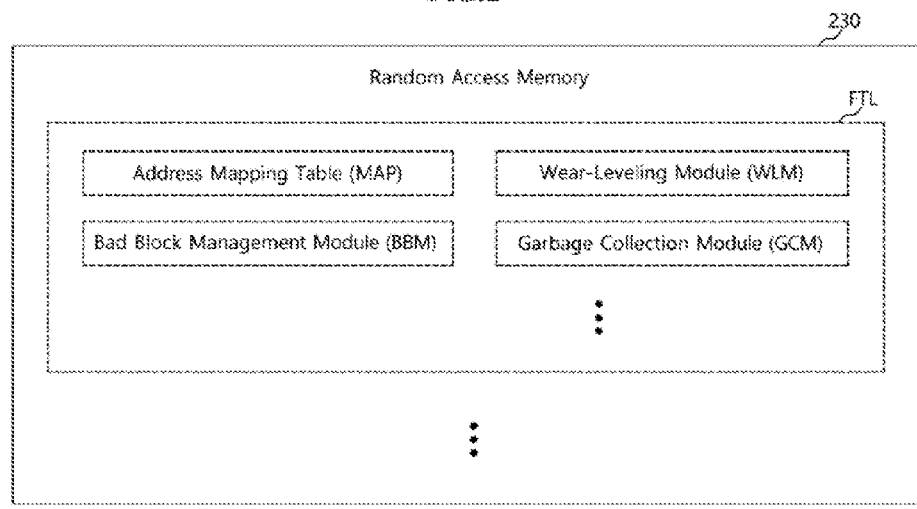
FIG. 2 is a diagram illustrating a software to be driven in the random access memory shown in FIG. 1, according to an embodiment of the present invention.

FIG. 2 is a diagram illustrating a software example to be driven in the random access memory 230 shown in FIG. 1, according to an embodiment of the present invention.

The control unit 210 of the data storage device 100 may drive a software referred to as a flash translation layer FTL to control at least one intrinsic operation of the flash memory device 300 and provide device compatibility to the host device. Through driving of the flash translation layer FTL, the data storage device 100 may be recognized as a general data storage device, for example, a hard disk, by the host device.

The flash translation layer FTL loaded on the random access memory 230 may be configured by modules for performing various functions and metadata necessary for driving of the modules. For example, as illustrated in FOG. 2, the flash translation layer FTL may include an address mapping table MAP, a wear-leveling module WLM, a bad block management module BBM and a garbage collection module GCM. The configuration of the flash translation layer FTL is not limited to the above-described modules, and may further include modules, for example, an interleaving module for operating in parallel a plurality of flash memory devices 300, a sudden power-off management module for managing an unexpected power-off, and other modules which are well-known in the relevant art.

In the case, where the host device accesses the data storage device 100 (e.g., requests a read operation or a write operation), the host device may provide a logical address to the data storage device 100. The flash translation layer FTL may translate the provided logical address into a physical address of the flash memory device 300, and perform a requested operation by referring to the translated physical address. In order for such an address translation operation to be performed, address translation data (e.g., an address mapping table MAP) may be included in the flash translation layer FTL.

The wear-leveling module WLM may manage wear levels of the memory blocks B1 to B8 of the flash memory device 300. Memory cells of the flash memory device 300 may be aged by an erase operation and a write operation. Aged memory cells (i.e., worn-out memory cells) may cause falls such as, for example, physical defects. The wear-leveling module WLM may manage the erase-write counts of respective memory blocks in such a way as to be leveled, in order to prevent a certain memory block from being worn out earlier than the other memory blocks.

The bad block management module BBM may manage a memory block in which a fall has occurred, among the memory blocks B1 to B8 of the flash memory device 300. As described above, a fall such as, for example, a physical defect may occur in a worn-out memory cell. Data stored in a failed memory cell may not be normally read out. Moreover, data may not be normally stored in a failed memory cell. The bad block management module BBM may manage a memory block including a failed memory cell, in such a way as not to be used.

The flash memory device 300 does not support overwrite of data due to a structural characteristic thereof. That is to say, it is impossible to store data in a memory cell written with data. Therefore, in order to rewrite data in a memory cell written with data, an erase operation should be preceded. This is referred to as an erase-before-write operation.

The erase operation of the flash memory device 300 requires a lengthy time. For this reason, the control unit 210 does not rewrite, after erasing a memory cell written with data, data in the erased memory cell. Instead, the control unit 210 stores data to be written in a memory cell written with data, in a memory cell returned to an erase state. By this operation of the control unit 210, valid data and invalid data are mixed in the flash memory device 300. As the occasion demands, the control unit 210 may perform a series of operations of collecting valid data to a place and erasing invalid data (i.e., a garbage collection operation). The garbage collection operation may be referred to as a merge operation.

Figure 3:
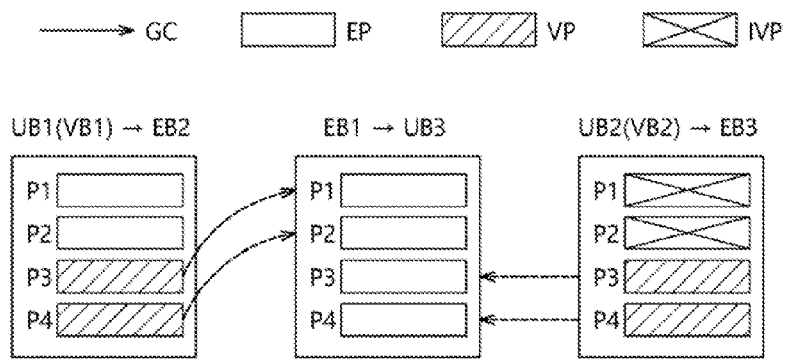
FIG. 3 is a diagram Illustrating a garbage collection operation performed by the garbage collection module of FIG. 2, according to an embodiment of the present invention.

The garbage collection module GCM may perform the garbage collection operation for the memory blocks B1 to B8 of the flash memory device 300, as shown in FIG. 3. The garbage collection module GCM may perform the garbage collection operation while carrying out a request from the host device. Otherwise, the garbage collection module GCM may perform the garbage collection operation as an internal operation for managing the flash memory device 300, regardless of a request from the host device.

FIG. 3 illustrates a garbage collection operation performed by the garbage collection module GCM of FIG. 2, according to an embodiment of the invention.

According to the embodiment of FIG. 3, a memory block not written with any data (e.g., an erased memory block) is defined as an empty block EB. An empty block EB in an erased state includes a plurality of empty pages EP. A memory block written with some data stored therein is defined as a used block UB. A used block UB may include at least one empty page EP, at least one page in which valid data is stored (hereinafter, referred to as a valid page VP) and at least one page in which invalid data is stored (hereinafter, referred to as an invalid page IVP). Among used memory blocks, a memory block which is determined as a target of the garbage collection operation, that is, a memory block for which the garbage collection operation is to be performed, is defined as a victim block VB.

Among the pages P1 to P4 of a first victim block VB1, valid pages P3 and P4 (except empty pages P1 and P2) may be respectively copied to empty pages P1 and P2 of an empty block EB1. Also, among the pages P1 to P4 of a second victim block VB2, valid pages P3 and P4 (except invalid pages P1 and P2) may be respectively copied to empty pages P3 and P4 of the empty block EB1. The empty block EB1 copied with the valid pages may thus become a used block UB3. After the valid pages are copied, the respective victim blocks VB1 and VB2 may be erased and become empty blocks EB2 and EB3.

The garbage collection (GC) operation involves an operation of copying a valid page VP to an empty block EB from a victim block VB (i.e., a write operation), and an operation of erasing the victim block VB. Thus, the garbage collection (GC) operation may consume much of the resources of the controller 200 and may require a lengthy operation time. Therefore, when a timing at which the garbage collection (GC) operation is performed or a time that is required for the garbage collection (GC) operation is optimized, the operating speed of the data storage device 100 may be enhanced. Alternatively, when an amount by which the garbage collection (GC) operation is performed, that is, a garbage collection (GC) performing amount or processing amount (hereinafter, referred to as a garbage collection throughput) is optimized, the operating speed of the data storage device 100 may be enhanced.

Figure 4:
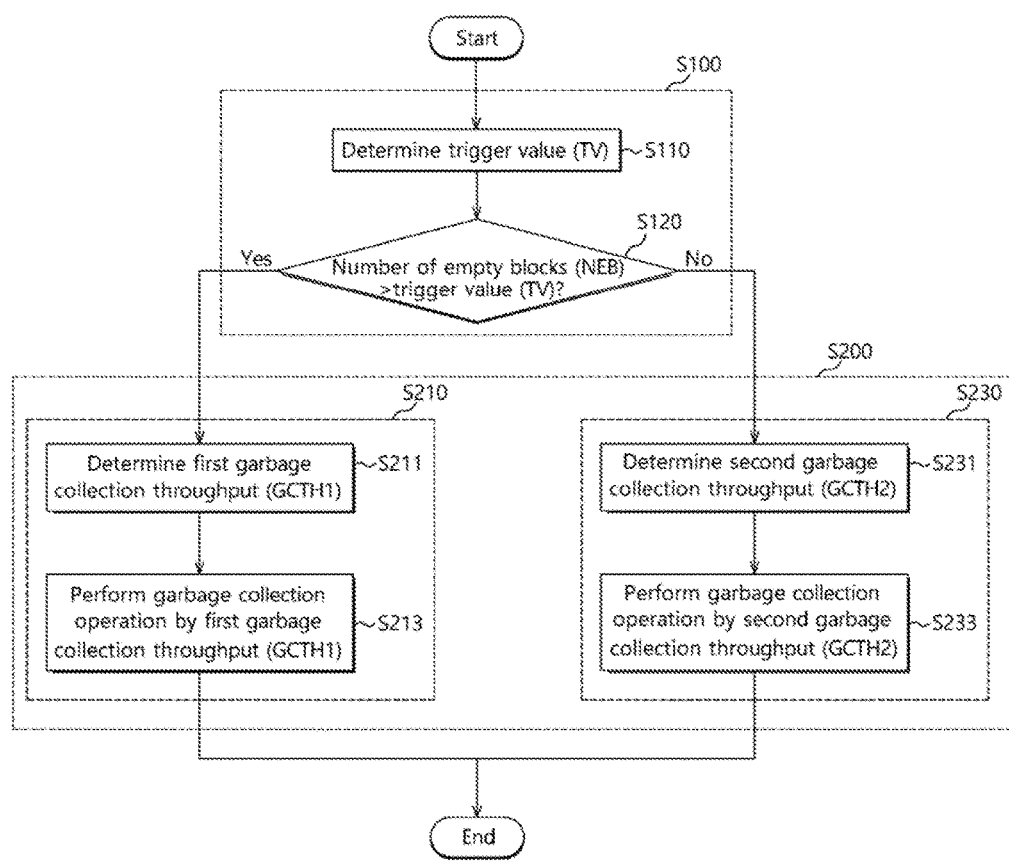
FIG. 4 is a flow chart illustrating a garbage collection operation, according to an embodiment of the present invention.

FIG. 4 is a flow chart illustrating a garbage collection operation according to an embodiment, of the present invention.

According to the embodiment of FIG. 4, the garbage collection operation performed by the garbage collection module (GCM) may include a first step (i.e., step S100) and second step (i.e., step S200). For the sake of convenience in explanation, the first step will be described first with reference to FIGS. 4 to 6, and the second step will be described later with reference to FIGS. 4 and 7.

The first step (i.e., the step S100) may be a step of determining what type is the garbage collection to be performed. The first step (i.e., the step S100) may include a step S110 of determining or calculating a trigger value TV and a step S120 of determining a type of garbage collection to be performed, according to the trigger value TV.

At step S110, the trigger value TV (or a determination reference value) may be determined. The trigger value TV may be calculated as in Equation 1.

$$TV = \frac{MEB}{VPDC} = \frac{MEB}{\frac{UBVPA}{NUB}}. \qquad (1)$$

Wherein,

MEB (hereinafter, referred to as minimum empty block) is a minimum number of empty blocks to be secured for the purpose of providing an empty memory region necessary for an internal operation (e.g., a reserved region or an over-provision region) for performance improvement, VPDC is a distribution characteristic of valid pages of (or in) the memory blocks B1 to B8, UBVPA is an average value of valid pages of used blocks, and NUB is the number of used blocks.

The valid page distribution characteristic VPDC is calculated by dividing an average value of valid pages of used blocks (hereinafter, referred to as average valid page) UBVPA by the number of used blocks NUB. The valid page distribution characteristic VPDC may be proportional to the average valid page UBVPA. A small valid page distribution characteristic VPDC means that the average valid page of used blocks UBVPA is small. Thus, a small valid page distribution characteristic VPDC means that data are inefficiently written in memory blocks, that is, data are written by being dispersed over a number of memory blocks. Conversely, a large valid page distribution characteristic VPDC means that the average valid page of used blocks UBVPA is large. Thus, a large valid page distribution characteristic VPDC means that data are efficiently written in memory blocks, that is, data are written by being concentrated in certain memory blocks.

The trigger value TV is calculated by dividing the minimum empty block MEB by the valid page distribution characteristic VPDC. The trigger value TV is inversely proportional to the valid page distribution characteristic VPDC. Accordingly, if the valid page distribution characteristic VPDC increases, the trigger value TV decreases. In other words, if data are efficiently written in memory blocks, the trigger value TV decreases. Conversely, if the valid page distribution characteristic VPDC decreases, the trigger value TV increases. In other words, if data are inefficiently written in memory blocks, the trigger value TV increases.

Because the trigger value TV is determined according to the valid page distribution characteristic VPDC, the trigger value TV is information that indicates whether data are written efficiently or inefficiently. Accordingly, the trigger value TV may be used as a reference value for determining a type of garbage collection to be performed subsequently.

Namely, at step S120, a comparison may be made to determine whether the number of currently empty blocks NEB is greater than the trigger value TV. According to the result of comparing the number of empty blocks NEB and the trigger value TV, a first type garbage collection operation GC1 or a second type garbage collection operation GC2 may be performed. For example, in the case where the number of empty blocks NEB is greater than the trigger value TV, the process may proceed to step S210, and the first type garbage collection operation GC1 may be performed. Conversely, in the case where the number of empty blocks NEB is equal to or less than the trigger value TV, the process may proceed to step S230, and the second type garbage collection operation GC2 may be performed.

Figure 5:
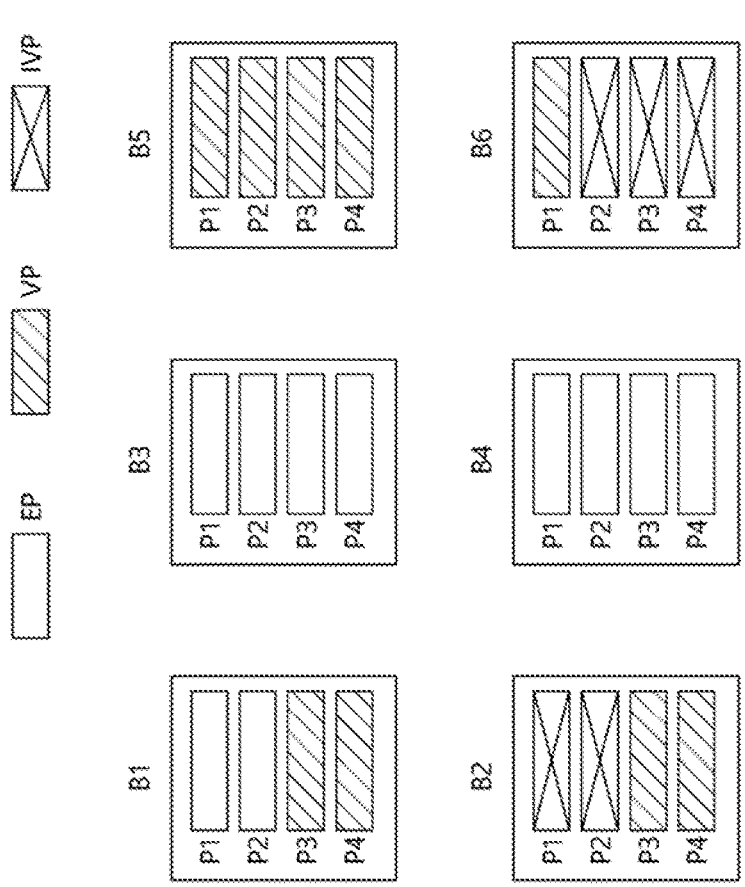
FIG. 5 is a diagram illustrating an example where data are efficiently written in memory blocks and thus a trigger value is small, according to an embodiment of the invention.

FIG. 5 is a diagram illustrating the case where data are efficiently written in memory blocks and thus the trigger value TV is small. As an example, the minimum empty block MEB is assumed to be "1."

According to the embodiment of FIG. 5, the number of empty blocks NEB may be determined to be three "3" i.e., empty blocks B3, B4 and B8. The number of used blocks NUB may be determined to be "5" i.e., used blocks B1, B2, B5, B6 and B7. The average valid page UBVPA may then be determined to be "2" by dividing the total number of valid pages of the used blocks B1, B2, B5, B6 and B7 of "10(=2+2+4+1+1)" by the number of used blocks NUB of "5." The trigger value TV may be determined to be "2.5" by dividing the minimum empty block MEB of "1" by the valid page distribution characteristic VPDC of "0.4."

Since the number of empty blocks NEB of "3" is greater than the trigger value TV of "2.5," it means that valid pages are more densely concentrated in the used blocks B1, B2, B5, B6 and B7. Because valid pages are more densely concentrated in the used blocks B1, B2, B5, B6 and B7, empty blocks EB are secured more than the minimum empty block MEB, and for this reason, it is not necessary to urgently perform the garbage collection operation. Therefore, in the case where the number of empty blocks NEB is greater than the trigger value TV, the first type garbage collection operation GC1 In which operations other than garbage collection are performed more densely concentrated than the garbage collection operation is performed.

Figure 6:
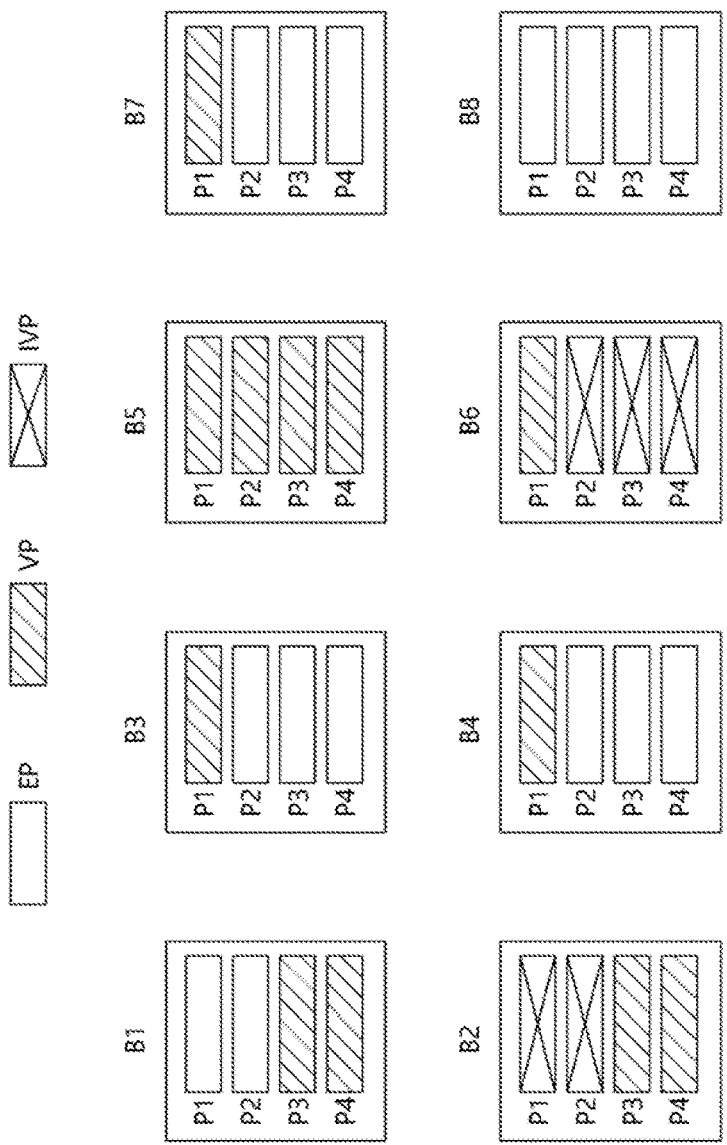
FIG. 6 is a diagram illustrating an example where data are inefficiently written in memory blocks and thus a trigger value is large, according to an embodiment of the present invention.

FIG. 6 is a diagram illustrating the case where data are inefficiently written in memory blocks and thus the trigger value TV is large. As an example, the minimum empty block MEB is assumed to be "1."

According to the embodiment of FIG. 6, the number of empty blocks NEB may be determined to be "1," i.e., empty block B8. The number of used blocks NUB may be determined to be "7," i.e., blocks B1 to B7. The average valid page UBVPA may be determined to be "0.58" by dividing the total number of valid pages of the used blocks B1 to B7 of "12(2+2+1+1+4+1+1)" by the number of used blocks NUB of "7." The trigger value TV may be determined to be "12.5" by dividing the minimum empty block MEB of "1" by the valid page distribution characteristic VPDC of "0.08."

Since the number of empty blocks NEB of "1" is equal to or less than the trigger value TV of "12.5," it means that valid pages are dispersed here and there in the used blocks B1 to B7. Because valid pages are dispersed here and there in the used blocks B1 to B7, empty blocks EB are less secured than the minimum empty block MEB, and for this reason, it is necessary to urgently perform the garbage collection operation. Therefore, in the case where the number of empty blocks NEB is equal to or less than the trigger value TV, the second type garbage collection operation GC2 in which the garbage collection operation is performed more densely concentrated than operations other than garbage collection may be performed.

Referring again to FIG. 4, the second step (i.e., the step S200) may be a step of performing the garbage collection operation of a type determined at the first step, by a garbage collection throughput. The second step (i.e., the step S200) may include the step S210 in which the first type garbage collection operation GC1 is performed and the step S230 in which the second type garbage collection operation GC2 is performed.

The step S210 in which the first type garbage collection operation GC1 is performed may include step S211 of determining a first garbage collection throughput GCTH1 and step S213 of performing the garbage collection operation by the first garbage collection throughput GCTH1.

At step S211, the first garbage collection throughput GCTH1 may be determined. The first garbage collection throughput GCTH1 may be calculated as in Equation 2.

$$GCTH1 = LPD \times f(v) \quad (2)$$

$$= LPD \times \{(RGCTH) \times (RUB)\}$$

$$= LPD \times \left\{\left(\frac{VVPDC}{VPDC}\right) \times \left(\frac{NUB}{NTB}\right)\right\}$$

$$= LPD \times \left\{\left(\frac{\frac{VBVPA}{NVB}}{\frac{UBVPA}{NUB}}\right) \times \left(\frac{NUB}{NTB}\right)\right\}$$

Wherein, the abbreviations of Equation 2 are as follows.

LPD means a limit value of performance that is degraded as the garbage collection operation is performed (hereinafter, referred to as limit performance). The limit performance LPD serves to limit a garbage collection throughput. In other words, the limit performance LPD may serve to control a ratio by which the garbage collection operation is performed and a ratio by which operations other than garbage collection are performed.

RGCTH as a variable of a function f(v) means a garbage collection throughput that is required. The required garbage collection throughput RGCTH may be calculated by dividing a valid page distribution characteristic of victim blocks VVPDC by the valid page distribution characteristic of used blocks VPDC. The valid page distribution characteristic of victim blocks VVPDC is calculated by dividing an average valid page of victim blocks VBVPA by the number of victim blocks NVB. The valid page distribution characteristic of used blocks VPDC is calculated by dividing the average valid page of used blocks UBVPA by the number of used blocks NUB.

It is assumed that the valid page distribution characteristic of victim blocks VVPDC is small and the valid page distribution characteristic of used blocks VPDC is large, that is, data are inefficiently written in victim blocks and data are efficiently written in used blocks. In this case, the gain to be obtained by performing the garbage collection operation is generally large. That is to say, in this case, empty blocks may be secured easily even though the garbage collection operation is performed to a lesser degree. Therefore, in such a manner that the garbage collection operation is performed to a lesser degree if the valid page distribution characteristic of victim blocks VVPDC is small and the valid page distribution characteristic of used blocks VPDC is large, the required garbage collection throughput RGCTH may be set to be proportional to the valid page distribution characteristic of victim blocks VVPDC and be inversely proportional to the valid page distribution characteristic of used blocks VPDC.

It is assumed that the valid page distribution characteristic of victim blocks VVPDC is large and the valid page distribution characteristic of used blocks VPDC is small, that is, data are efficiently written in victim blocks and data are inefficiently written in used blocks. In this case, a gain that may be obtained by performing the garbage collection operation may be small. That is to say, in this case, empty blocks may not be secured easily even though the garbage collection operation is performed to a greater degree. Therefore, in such a manner that the garbage collection operation is performed to a greater degree if the valid page distribution characteristic of victim blocks VVPDC is large and the valid page distribution characteristic of used blocks VPDC is small, the required garbage collection throughput RGCTH may be set to be proportional to the valid page distribution characteristic of victim blocks VVPDC and be inversely proportional to the valid page distribution characteristic of used blocks VPDC.

RUB as another variable of the function f(v) means a ratio of used blocks with respect to total memory blocks. The ratio of used blocks RUB is calculated by dividing the number of used blocks NUB by the number of total blocks NTB. The ratio of used blocks RUB serve to control an influence exerted on the function f(v) by the variable RGCTH.

Figure 7:
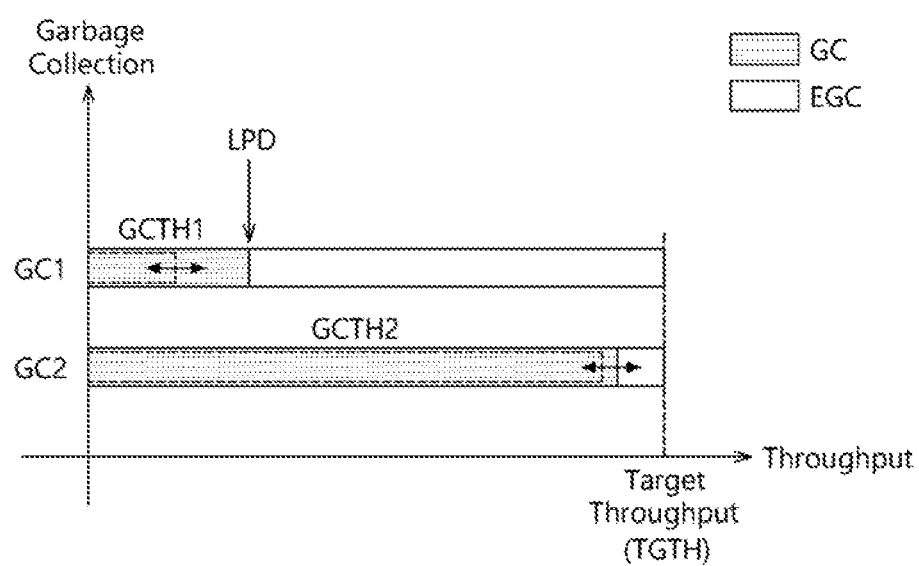
FIG. 7 is a diagram Illustrating first and second garbage collection operations, according to an embodiment of the present invention.

The first garbage collection throughput GCTH1 may be determined according to the limit performance LPD and the function f(v). Accordingly, as shown in FIG. 7, the first garbage collection throughput GCTH1 may vary within the limit performance LPD. Even though a required garbage collection throughput is determined by the function f(v), the garbage collection throughput may be limited by the limit performance LPD. In other words, by the limit performance LPD, operations other than garbage collection EGC may be performed more densely concentrated than a garbage collection operation GC. For this reason, the first type garbage collection operation GC1 may be defined as a garbage collection operation wherein a ratio by which the operations other than garbage collection EGC are performed is higher than a ratio by which the garbage collection operation GC is performed.

For instance, the operations other than garbage collection EGC may include operations for processing requests from the host device, for example, read and write operations for the flash memory device 300, data input/output operations to and from the host device, and the like. The more operations other than garbage collection EGC are performed, the more easy it becomes for the data storage device 100 to reach a target throughput TGTH that means a data input/output amount to be satisfied.

Step S230 in which the second type garbage collection operation GC2 is performed may include step S231 of determining a second garbage collection throughput GCTH2 and step S233 of performing the garbage collection operation by the second garbage collection throughput GCTH2.

At step S231, the second garbage collection throughput GCTH2 may be determined. The second garbage collection throughput GCTH2 may be calculated as in Equation 3.

$$GCTH2 = f(v) \quad (3)$$

$$= \{(RGCTH) \times (RUB)\}$$

$$= \left\{\left(\frac{VVPDC}{VPDC}\right) \times \left(\frac{NUB}{NTB}\right)\right\}$$

$$= \left\{\left(\frac{\frac{VBVPA}{NVB}}{\frac{UBVPA}{NUB}}\right) \times \left(\frac{NUB}{NTB}\right)\right\}$$

Wherein, the abbreviations of Equation 3 are as follows.

RGCTH as a variable of a function f(v) is a required garbage collection throughput. The required garbage collection throughput RGCTH is calculated by dividing a valid page distribution characteristic of victim blocks VVPDC by the valid page distribution characteristic of used blocks VPDC. The valid page distribution characteristic of victim blocks VVPDC is calculated by dividing an average valid page of victim blocks VBVPA by the number of victim blocks NVB. The valid page distribution characteristic of used blocks VPDC is calculated by dividing the average valid page of used blocks UBVPA by the number of used blocks NUB.

It is assumed that the valid page distribution characteristic of victim blocks VVPDC is small and the valid page distribution characteristic of used blocks VPDC is large, that is, data are inefficiently written in victim blocks and data are efficiently written in used blocks. In this case, the gain to be obtained by performing the garbage collection operation is large. That is to say, in this case, empty blocks may be secured easily even though the garbage collection operation is performed to a lesser degree. Therefore, in such a manner that the garbage collection operation is performed to a lesser degree if the valid page distribution characteristic of victim blocks VVPDC is small and the valid page distribution characteristic of used blocks VPDC is large, the required garbage collection throughput RGCTH may be set to be proportional to the valid page distribution characteristic of victim blocks VVPDC and be inversely proportional to the valid page distribution characteristic of used blocks VPDC.

It is assumed that the valid page distribution characteristic of victim blocks VVPDC is large and the valid page distribution characteristic of used blocks VPDC is small, that is, data are efficiently written in victim blocks and data are inefficiently written in used blocks. In this case, a gain that may be obtained by performing the garbage collection operation may be small. That is to say, in this case, empty blocks may not be secured easily even though the garbage collection operation is performed to a greater degree. Therefore, in such a manner that the garbage collection operation is performed to a greater degree if the valid page distribution characteristic of victim blocks VVPDC is large and the valid page distribution characteristic of used blocks VPDC is small, the required garbage collection throughput RGCTH may be set to be proportional to the valid page distribution characteristic of victim blocks VVPDC and be inversely proportional to the valid page distribution characteristic of used blocks VPDC.

RUB is another variable of the function f(v) and means a ratio of used blocks with respect to the total memory blocks. The ratio of used blocks RUB is calculated by dividing the number of used blocks NUB by the number of total blocks NTB. The ratio of used blocks RUB serves to control an influence exerted on the function f(v) by the variable RGCTH.

The second garbage collection throughput GCTH2 may be determined according to the function f(v). Accordingly, as shown in FIG. 7, the second garbage collection throughput GCTH2 may vary within the target throughput TGTH. That is to say, for securing empty blocks even though the target throughput TGTH is not reached as the garbage collection operation is performed, the garbage collection operation GC may be performed in a more concentrated manner by the second garbage collection throughput GCTH2. For this reason, the second type garbage collection operation GC2 may be defined as a garbage collection operation wherein a ratio by which the garbage collection operation GC is performed is higher than a ratio by which the operations other than garbage collection EGC are performed.

Figure 8:
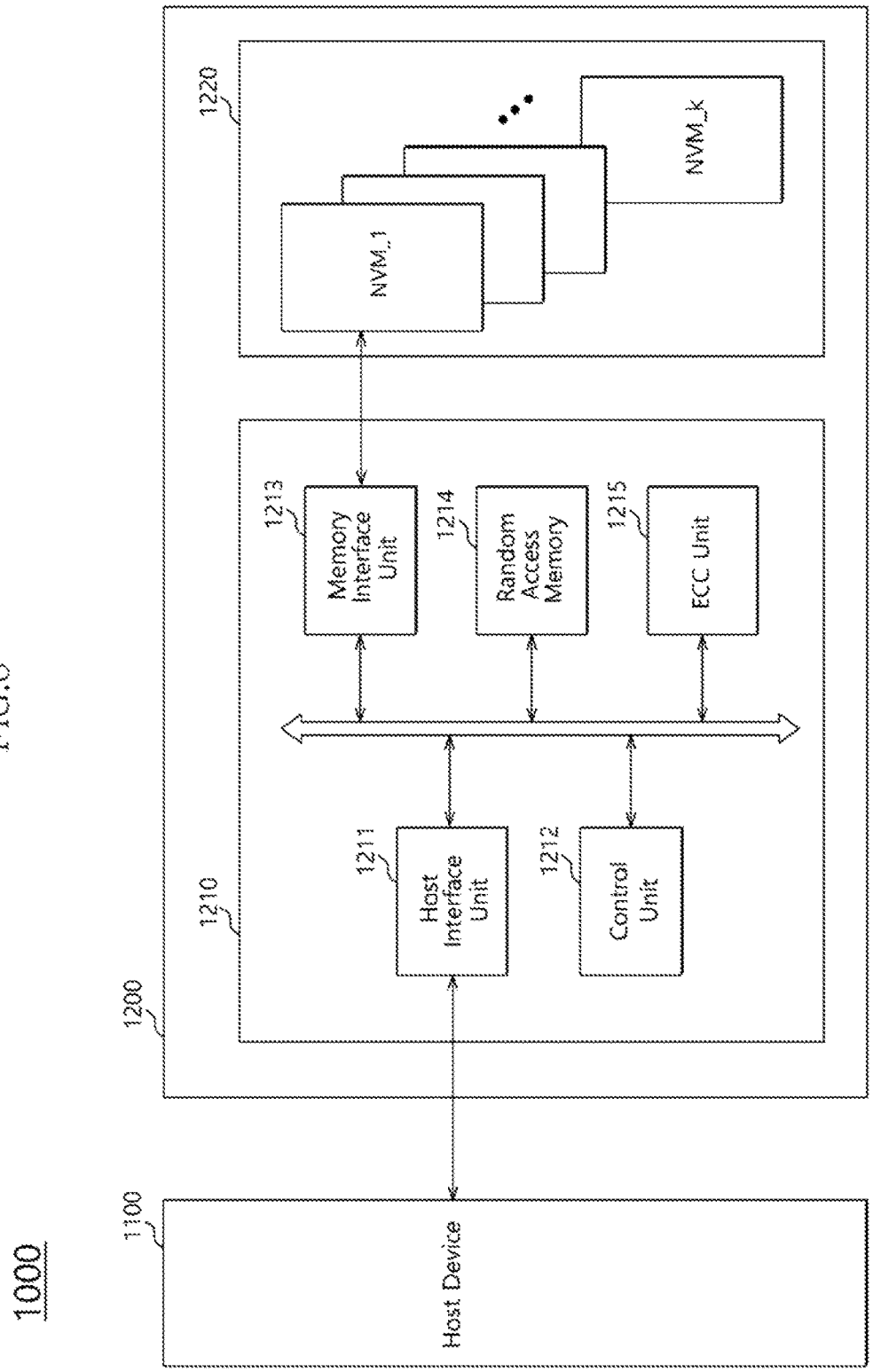
FIG. 8 is a block diagram Illustrating a data processing system including a data storage device, according to an embodiment of the present invention.

FIG. 8 is a block diagram illustrating a data processing system 1000 including a data storage device 1200, according to an embodiment of the present invention.

According to the embodiment of FIG. 8, the data processing system 1000 may include a host device 1100 and the data storage device 1200.

The data storage device 1200 may include a controller 1210 and a nonvolatile memory device 1220. The data storage device 1200 may be used by being coupled to the host device 1100, for example, a mobile phone, an MP3 player, a laptop computer, a desktop computer, a game player, a TV, an in-vehicle infotainment system, and the like. The data storage device 1200 is also referred to as a memory system.

The controller 1210 may include a host interface unit 1211, a control unit 1212, a memory interface unit 1213, a random access memory 1214, and an error correction code (ECC) unit 1215.

The control unit 1212 may control the general operations of the controller 1210 in response to a request from the host device 1100. The control unit 1212 may drive a firmware or a software for controlling the nonvolatile memory device 1220.

The control unit 1212 may perform the garbage collection operation described above with reference to FIGS. 4 to 7. Accordingly, the garbage collection operation of the data storage device 1200 may be optimized, and hence, the operating speed of the data storage device 1200 may be enhanced.

The random access memory 1214 may be used as the working memory of the control unit 1212. The random access memory 1214 may be used as a buffer memory which temporarily stores data read out from the nonvolatile memory device 1220 or data provided from the host device 1100.

The host Interface unit 1211 may interface the host device 1100 and the controller 1210. For example, the host interface unit 1211 may communicate with the host device 1100 through one of various interface protocols such as a universal serial bus (USB) protocol, a universal flash storage (UFS) protocol, a multimedia card (MMC) protocol, a peripheral component interconnection (PCI) protocol, a PCI express (PCI-E) protocol, a parallel advanced technology attachment (PATA) protocol, a serial advanced technology attachment (SATA) protocol, a small computer system interface (SCSI) protocol, and a serial attached SCSI (SAS) protocol.

The memory interface unit 1213 may interface the controller 1210 and the nonvolatile memory device 1220. The memory interface unit 1213 may provide a command and an address to the nonvolatile memory device 1220. Furthermore, the memory interface unit 1213 may exchange data with the nonvolatile memory device 1220.

The error correction code (ECC) unit 1215 may ECC-encode data to be stored in the nonvolatile memory device 1220. Also, the error correction code (ECC) unit 1215 may ECC-decode data read out from the nonvolatile memory device 1220.

The nonvolatile memory device 1220 may be used as the storage medium of the data storage device 1200. The nonvolatile memory device 1220 may Include a plurality of nonvolatile memory chips (or dies) NVM_1 to NVM_k.

The controller 1210 and the nonvolatile memory device 1220 may be manufactured as any one of various data storage devices. For example, the controller 1210 and the nonvolatile memory device 1220 may be integrated into one semiconductor device and may be manufactured as any one of a multimedia card in the form of an MMC, an eMMC, an RS-MMC and a micro-MMC, a secure digital card in the form of an SD, a mini-SD and an micro-SD, a universal serial bus (USB) storage device, a universal flash storage (UFS) device, a Personal Computer Memory Card International Association (PCMCIA) card, a compact flash (CF) card, a smart media card, a memory stick, and the like.

Figure 9:
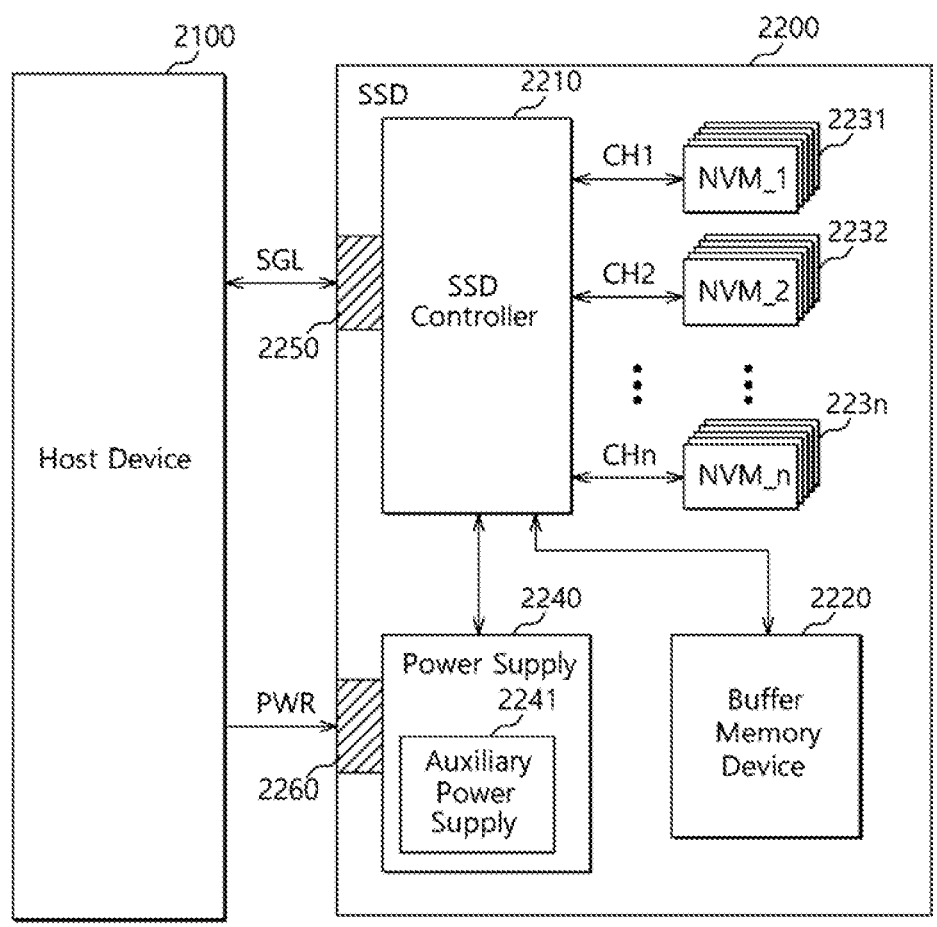
FIG. 9 is a block diagram illustrating a data processing system including a solid state drive (SSD), according to an embodiment of the present invention.

FIG. 9 is a block diagram illustrating a data processing system 2000 including a solid state drive (SSD) 2200, according to an embodiment of the present invention.

According to the embodiment of FIG. 9, the data processing system 2000 may include a host device 2100 and the solid state drive (SSD) 2200.

The SSD 2200 may include an SSD controller 2210, a buffer memory device 2220, nonvolatile memory devices 2231 to 223n, a power supply 2240, a signal connector 2250, and a power connector 2260.

The SSD controller 2210 may access the nonvolatile memory devices 2231 to 223n in response to a request from the host device 2100.

The buffer memory device 2220 may temporarily store data be stored in the nonvolatile memory devices 2231 to 223n. Further, the buffer memory device 2220 may temporarily store data read out from the nonvolatile memory devices 2231 to 223n. The data temporarily stored in the buffer memory device 2220 may be transmitted to the host device 2100 or the nonvolatile memory devices 2231 to 223n under control of the SSD controller 2210.

The nonvolatile memory devices 2231 to 223n may be used as storage media of the SSD 2200. The nonvolatile memory devices 2231 to 223n may be coupled with the SSD controller 2210 through a plurality of channels CH1 to CHn, respectively. One or more nonvolatile memory devices may be coupled to one channel. The nonvolatile memory devices coupled to each channel may be coupled to the same signal bus and data bus.

The power supply 2240 may provide power PWR inputted through the power connector 2260, to the inside of the SSD 2200. The power supply 2240 may include an auxiliary power supply 2241. The auxiliary power supply 2241 may supply power so as to allow the SSD 2200 to be normally terminated when a sudden power-off occurs. The auxiliary power supply 2241 may include capacitors with large capacitance capable of charging power PWR.

The SSD controller 2210 may exchange a signal SGL with the host device 2100 through the signal connector 2250. The signal SGL may include a command, an address, data, and the like. The signal connector 2250 may be configured by a connector, for example, one of parallel advanced technology attachment (PATA), serial advanced technology attachment (SATA), small computer system Interface (SCSI), serial attached SCSI (SAS), peripheral component interconnection (PCI), PCI express (PCI-E) and a universal flash storage (UFS) protocols, according to an interface scheme between the host device 2100 and the SSD 2200.

Figure 10:
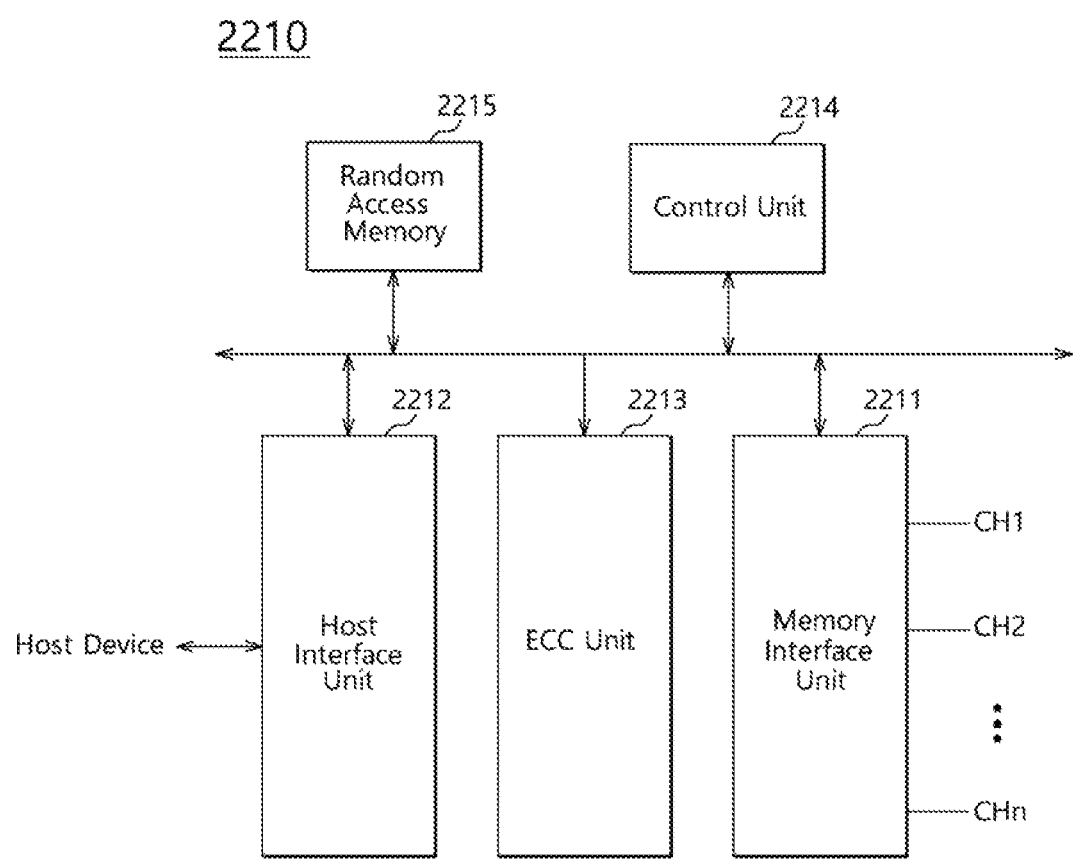
FIG. 10 is a block diagram illustrating an example configuration of the SSD controller shown in FIG. 9, according to an embodiment of the present invention.

FIG. 10 is a block diagram illustrating an example configuration of the solid state drive (SSD) controller 2210 shown in FIG. 9.

According to the embodiment of FIG. 10, the SSD controller 2210 may include a memory Interface unit 2211, a host interface unit 2212, an error correction code (ECC) unit 2213, a control unit 2214, and a random access memory (RAM) 2215.

The memory interface unit 2211 may provide control signals, for example, commands and addresses to the nonvolatile memory devices 2231 to 223n. Moreover, the memory interface unit 2211 may exchange data with the nonvolatile memory devices 2231 to 223n. The memory interface unit 2211 may scatter data transmitted from the buffer memory device 2220 to the respective channels CH1 to CHn, under control of the control unit 2214. Furthermore, the memory interface unit 2211 may transmit data read out from the nonvolatile memory devices 2231 to 223n to the buffer memory device 2220, under control of the control unit 2214.

The host interface unit 2212 may provide an interface with the host device 2100 in correspondence to a certain protocol. For example, the host interface unit 2212 may communicate with the host device 2100 through one of parallel advanced technology attachment (PATA), serial advanced technology attachment (SATA), small computer system interface (SCSI), serial attached SCSI (SAS), peripheral component interconnection (PCI), PCI express (PCI-E) and a universal flash storage (UFS) protocols. In addition, the host interface unit 2212 may perform a disk emulating function of supporting the host device 2100 to recognize the SSD 2200 as a hard disk drive (HDD).

The control unit 2214 may analyze and process the signal SGL inputted from the host device 2100. The control unit 2214 may control operations of the buffer memory device 2220 and the nonvolatile memory devices 2231 to 223n according to a firmware or a software for driving the SSD 2200. The random access memory 2215 may be used as a working memory for driving the firmware or the software.

The control unit 2214 may perform the garbage collection operation described above with reference to FIGS. 4 to 7. Accordingly, the garbage collection operation of the SSD 2200 may be optimized, and hence, the operating speed of the SSD 2200 may be enhanced.

The error correction code (ECC) unit 2213 may generate parity data to be transmitted to the nonvolatile memory devices 2231 to 223n, among data stored in the buffer memory device 2220. The generated parity data may be stored, along with data, in the is nonvolatile memory devices 2231 to 223n. The error correction code (ECC) unit 2213 may detect an error of the data read out from the nonvolatile memory devices 2231 to 223n. When the detected error is within a correctable range, the error correction code (ECC) unit 2213 may correct the detected error.

Figure 11:
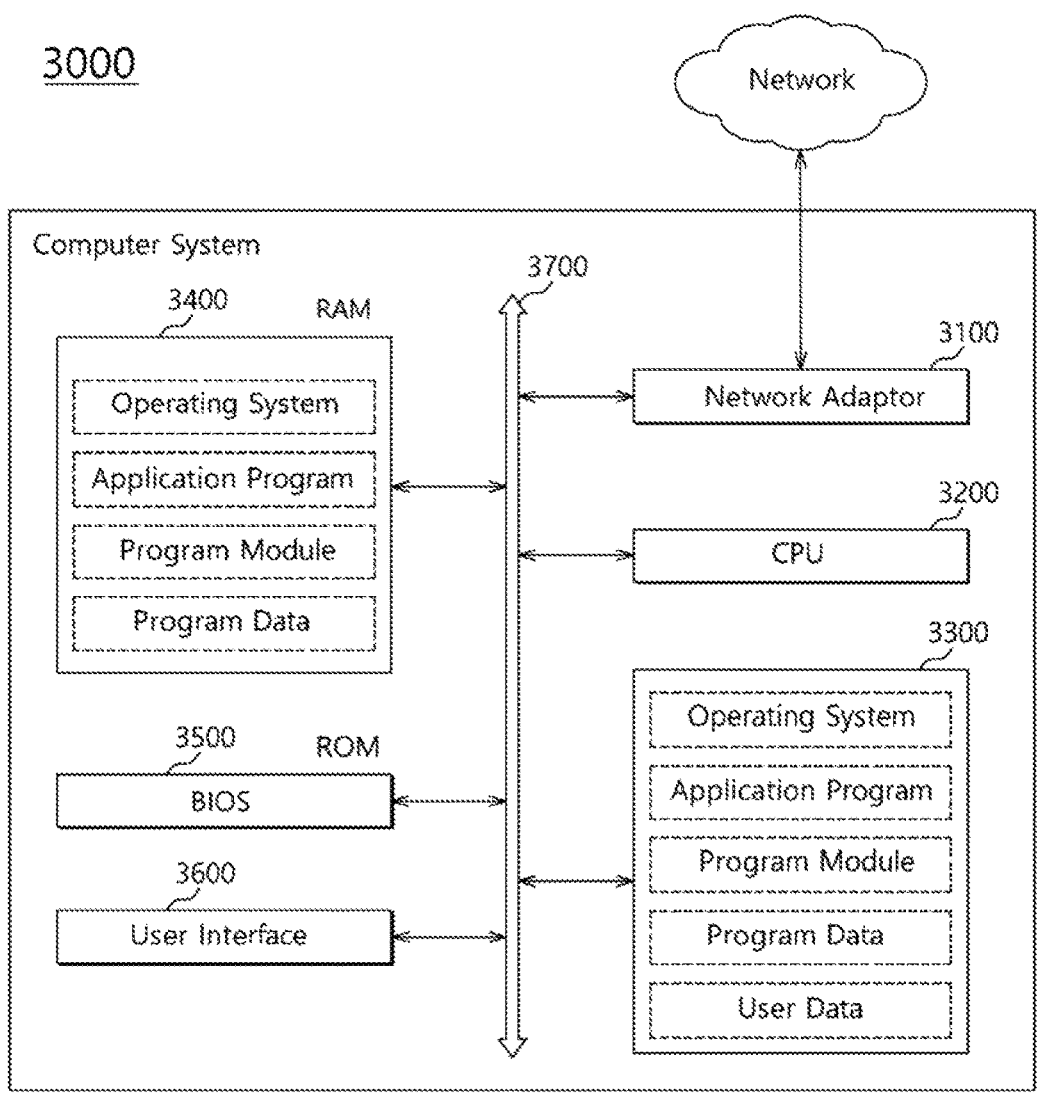
FIG. 11 is a block diagram illustrating a computer system Including a data storage device according to an embodiment of the present invention.

FIG. 11 is a block diagram illustrating a computer system 3000 included a data storage device 3300, according to an embodiment of the invention.

According to the embodiment of FIG. 11, the computer system 3000 may include a network adaptor 3100, a central processing unit (CPU) 3200, the data storage device 3300, a random access memory (RAM) 3400, a read only memory (ROM) 3500 and a user interface 3600, which are coupled electrically to a system bus 3700. The data storage device 3300 may be the data storage device 100 shown in FIG. 1, the data storage device 1200 shown in FIG. 8 or the SSD 2200 shown in FIG. 9.

The network adaptor 3100 may provide interfacing between the computer system 3000 and external networks. The central processing unit 3200 may perform general calculation processing for driving an operating system residing at the RAM 3400 or an application program.

The data storage device 3300 may store general data needed in the computer system 3000. For example, an operating system for driving the computer system 3000, an application program, various program modules, program data and user data may be stored in the data storage device 3300.

The RAM 3400 may be used as the working memory of the computer system 3000. Upon booting, the operating system, the application program, the various program modules and the program data needed for driving programs, which are read out from the data storage device 3300, may be loaded on the RAM 3400. A basic input/output system (BIOS) which is activated before the operating system is driven, may be stored in the ROM 3500. Information exchange between the computer system 3000 and a user may be implemented through the user interface 3600.

Figure 12:
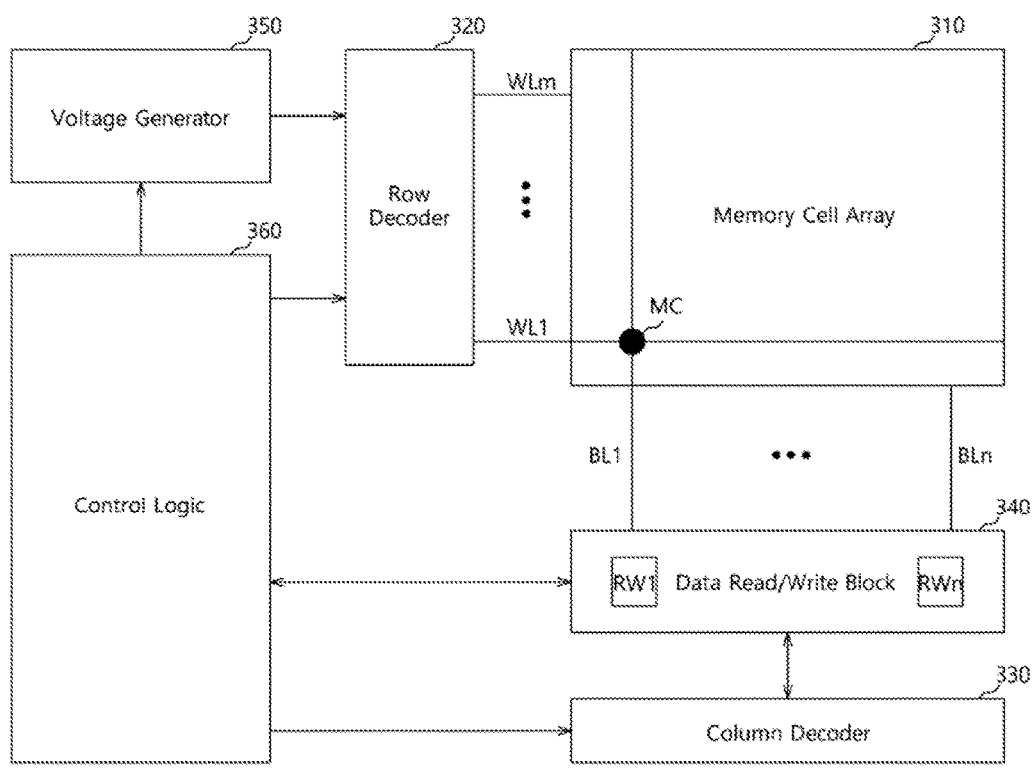
FIG. 12 is a block diagram illustrating a nonvolatile memory device included in a data storage device, according to an embodiment of the present invention.

FIG. 12 is a block diagram Illustrating a nonvolatile memory device 300 included in a data storage device, according to an embodiment of the present invention.

According to the embodiment of FIG. 12, the nonvolatile memory device 300 may include a memory cell array 310, a row decoder 320, a column decoder 330, a data read/write block 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For Instance, the row decoder 320 may provide a word line voltage provided from the voltage generator 350, to the word lines WL1 to WLm.

The data read/write block 340 may be coupled with the memory cell array 310 through the bit lines BL1 to BLn. The data read/write block 340 may include read/write circuits RW1 to RWn respectively corresponding to the bit lines BL1 to BLn. The data read/write block 340 may operate according to control of the control logic 360. The data read/write block 340 may operate as a write driver or a sense amplifier according to an operation mode. For example, the data read/write block 340 may operate as a write driver which stores data provided from the external device, in the memory cell array 310 in a write operation. For another example, the data read/write block 340 may operate as a sense amplifier which reads out data from the memory cell array 310 in a read operation.

The column decoder 330 may operate according to control of the control logic 360. The column decoder 330 may decode an address provided from the external device. The column decoder 330 may couple the read/write circuits RW1 to RWn of the data read/write block 340 respectively corresponding to the bit lines BL1 to BLn with data input/output lines (or data input/output buffers), based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300, for example, read, write and erase operations of the nonvolatile memory device 300.

We also note, that in some instances, as would be apparent to those skilled in the relevant art, a feature or element described in connection with one embodiment may be used singly or in combination with other features or elements of another embodiment, unless otherwise specifically indicated.

While various embodiments have been described above, it will be understood to those skilled in the art that the embodiments described are examples only. Accordingly, the operating method of a data storage device described herein should not be limited to the described embodiments. It will be apparent to those skilled in the relevant art that various changes and modifications may be made without departing from the spirit and scope of the invention as defined in the following claims.

What is claimed is:

1. A method for operating a data storage device, comprising:
   determining a valid page distribution characteristic of used memory blocks; and
   performing a garbage collection operation based on the valid page distribution characteristic of used memory blocks,
   wherein the garbage collection operation includes a first type garbage collection operation and a second type garbage collection operation,
   wherein the performing of the garbage collection operation comprises:
   performing one of the first type garbage collection operation and the second type garbage collection operation according to a result of comparing a trigger value and the number of empty memory blocks, the trigger value being determined based on the valid page distribution characteristic of used memory blocks,
   wherein, in the case where the number of empty memory blocks is greater than the trigger value, it is determined that the first type garbage collection operation is to be performed, and
   in the case where the number of empty memory blocks is equal to or less than the trigger value, it is determined that the second type garbage collection operation is to be performed,
   wherein the first type garbage collection operation is performed by a first garbage collection throughput that is proportional to a required garbage collection throughput and a ratio of used memory blocks, and
   wherein the second type garbage collection operation is performed by a second garbage collection throughput that is proportional to the required garbage collection throughout and the ratio of used memory blocks.

2. The method according to claim 1, wherein the valid page distribution characteristic of used memory blocks is determined by dividing an average value of valid pages of used memory blocks by the number of used memory blocks.

3. The method according to claim 1, wherein the trigger value is determined by dividing a minimum number of empty memory blocks by the valid page distribution characteristic.

4. The method according to claim 1, wherein the required garbage collection throughput is determined by dividing a valid page distribution characteristic of victim memory blocks meaning a state in which valid pages of victim memory blocks selected as a target of the garbage collection operation are distributed, by the valid page distribution characteristic of used memory blocks.

5. The method according to claim 4, wherein the valid page distribution characteristic of victim memory blocks is determined by dividing an average value of valid pages of victim memory blocks by the number of victim memory blocks.

6. The method according to claim 1, wherein the ratio of used memory blocks is determined by dividing the number of used memory blocks by the number of total memory blocks.

7. The method according to claim 1, wherein the first garbage collection throughput is determined by multiplying the required garbage collection throughput, and a limit value that limits the required garbage collection throughput.

8. The method according to claim 1, wherein the second garbage collection throughput is determined by using the required garbage collection throughput.

9. A data storage device comprising:
a memory device including a plurality of memory blocks; and
a controller suitable for determining a valid page distribution characteristic of used memory blocks among the plurality of memory blocks, and performing a garbage collection operation based on the valid page distribution characteristic of used memory blocks,
wherein the garbage collection operation includes a first type garbage collection operation and a second type garbage collection operation,
wherein the controller performs one of the first type garbage collection operation and the second type garbage collection operation according to a result of comparing a trigger value and the number of empty memory blocks, the trigger value determined based on the valid page distribution characteristic of used memory blocks,
wherein, in the case where the number of empty memory blocks is greater than the trigger value, the controller determines that the first type garbage collection operation is to be performed, and
in the case where the number of empty memory blocks is equal to or less than the trigger value, the controller determines that the second type garbage collection operation is to be performed,
wherein the controller performs the first type garbage collection operation by a first garbage collection throughput that is proportional to a required garbage collection throughput and a ratio of used memory blocks, and
wherein the controller performs the second type garbage collection operation by a second garbage collection throughput that is proportional to the required garbage collection throughout and the ratio of used memory blocks.

10. The device according to claim 9, wherein the controller determines the valid page distribution characteristic of used memory blocks by dividing an average value of valid pages of used memory blocks by the number of used memory blocks.

11. The device according to claim 9, wherein the controller determines the trigger value by dividing a minimum number of empty memory blocks by the valid page distribution characteristic.

12. The device according to claim 9, wherein the controller determines the required garbage collection throughput by dividing a valid page distribution characteristic of victim memory blocks meaning a state in which valid pages of victim memory blocks selected as a target of the garbage collection operation are distributed, by the valid page distribution characteristic of used memory blocks.

13. The device according to claim 12, wherein the controller determines the valid page distribution characteristic of victim memory blocks by dividing an average value of valid pages of victim memory blocks by the number of victim memory blocks.

14. The device according to claim 9, wherein the controller determines the ratio of used memory blocks by dividing the number of used memory blocks by the number of total memory blocks.

15. The device according to claim 9, wherein the controller determines the first garbage collection throughput by multiplying the required garbage collection throughput, and a limit value that limits the required garbage collection throughput.

16. The device according to claim 9, wherein the controller determines the second garbage collection throughput by using the required garbage collection throughput.

* * * * *